United States Patent [19]
Heglund et al.

[11] Patent Number: 6,011,377
[45] Date of Patent: Jan. 4, 2000

[54] SWITCHED RELUCTANCE STARTER/ GENERATOR SYSTEM AND METHOD OF CONTROLLING SAME

[75] Inventors: William S. Heglund, Davis Junction; Stephen R. Jones, Rockford, both of Ill.

[73] Assignee: Hamilton Sundstrand Corporation, Rockford, Ill.

[21] Appl. No.: 08/204,913

[22] Filed: Mar. 1, 1994

[51] Int. Cl.⁷ .................................. H02P 8/00; H02P 1/46
[52] U.S. Cl. ........................... 318/701; 318/254; 318/439
[58] Field of Search ..................................... 318/701, 254, 318/439; 310/168, 68 D, 143, 216

[56] References Cited

U.S. PATENT DOCUMENTS

| | | | |
|---|---|---|---|
| 3,956,678 | 5/1976 | Byrne et al. | 318/254 |
| 4,253,053 | 2/1981 | Ray et al. | 318/701 |
| 4,387,326 | 6/1983 | Ray et al. | 318/701 |
| 4,454,465 | 6/1984 | Greene | 310/68 D |
| 4,500,824 | 2/1985 | Miller | 318/701 |
| 4,595,865 | 6/1986 | Jahns | 318/254 |
| 4,611,157 | 9/1986 | Miller et al. | 318/696 |
| 4,642,543 | 2/1987 | MacMinn | 318/696 |
| 4,684,867 | 8/1987 | Miller et al. | 318/701 |
| 4,707,650 | 11/1987 | Bose | 318/685 |

OTHER PUBLICATIONS

Article entitled "Control of a Switched–Relutance Aircraft Engine Starter–Generator Over a Very Wide Speed Range", written by Stephen R. MacMinn and James W. Sember. Mar. 1989 IEEE.

Article entitled "A Very High Speed Switched–Reluctance Starter–Generator For Aircraft Engine Applications", written by Stephen R. MacMinn and William D. Jones in the Proceedings of NAECON '89, National Aerospace Electronics Conference, May 22–26, 1989 in Dayton, Ohio.

Article entitled "Microcomputer Control of Switched Reluctance Motor", written by B.K. Bose, T.J.E. Miller, P.M. Szczesny and W.H. Bicknell, published in Sep. 1985 IEEE.

Article entitled "Switched Reluctance Starter–Generator" written by Arthur Radun, James Rulison, and Peter Sanza. A SAE technical paper series for Aerotech '92, Anaheim, California Oct. 5–8, 1992.

*Primary Examiner*—Paul Ip
*Attorney, Agent, or Firm*—Jeffery J. Makeever

[57] ABSTRACT

An electric power starter/generator system for converting electrical energy from a remote dc electrical power source coupled to a dc distribution bus to mechanical energy to start a turbine engine in a start mode, and for converting mechanical energy from the turbine engine to electrical energy to power utilization equipment connected to the dc bus in a generate mode, comprises a switched reluctance machine, an inverter having a dc input/output coupled to the dc distribution bus, and at least a first and a second switch coupling each of the machine's phase windings to the dc bus, and at least a first and a second diode for cross-cupling each of said phase windings to the dc bus, and a controller coupled to the inverter for monitoring and controlling system performance during the start mode and the generate mode of system operation. The controller monitors rotor position and generates switching control signals to enable the switches for each of the phase windings at a fixed angle prior to alignment of the rotor pole with the associated stator pole, coupling the phase winding to the dc bus and allowing dc phase current to flow to energize the winding. The controller further generates switching control signals to disable the switches at a fixed angle after alignment, decoupling the phase winding from the dc bus and forcing dc current flow back through the diodes to allow the switched reluctance machine to operate as a generator. During this mode, the controller monitors phase current and dc bus voltage, calculates a maximum phase current limit and a minimum phase current limit, and modulates the switches to regulate the dc phase current within these limits. In this way, the controller maintains the dc bus voltage at a desired level regardless of system load. The controller also allows operation in a start mode.

13 Claims, 11 Drawing Sheets

U.S. PATENT DOCUMENTS

| | | | |
|---|---|---|---|
| 4,713,594 | 12/1987 | Bose et al. | 318/685 |
| 4,739,240 | 4/1988 | MacMinn et al. | 318/696 |
| 4,772,839 | 9/1988 | MacMinn et al. | 318/696 |
| 4,896,088 | 1/1990 | Jahns | 318/696 |
| 4,896,089 | 1/1990 | Kliman et al. | 318/701 |
| 4,916,346 | 4/1990 | Kliman | 310/216 |
| 4,918,831 | 4/1990 | Kliman | 29/598 |
| 4,933,621 | 6/1990 | MacMinn et al. | 318/696 |
| 4,943,760 | 7/1990 | Byrne et al. | 318/701 |
| 4,959,596 | 9/1990 | MacMinn et al. | 318/254 |
| 5,012,171 | 4/1991 | Sember | 318/696 |
| 5,012,172 | 4/1991 | Sember | 318/696 |
| 5,051,680 | 9/1991 | Belanger | 318/701 |
| 5,075,610 | 12/1991 | Harris | 318/701 |
| 5,111,091 | 5/1992 | Bahn | 310/68 |
| 5,166,591 | 11/1992 | Stephens et al. | 318/701 |
| 5,296,787 | 3/1994 | Albrecht et al. | 318/254 |

# 6,011,377

SWITCHED RELUCTANCE STARTER/GENERATOR SYSTEM AND METHOD OF CONTROLLING SAME

This invention was made with Government support under prime contract DAAE07-91-C-R007 awarded by the Department of Defense. The Government has certain rights in this invention.

FIELD OF THE INVENTION

The present invention relates generally to electric power starter/generator systems, and more particularly to a switched reluctance machine based starter/generator system utilizing variable-angle starter control, and fixed-angle current regulated generator control.

BACKGROUND ART

Switched reluctance machines have long been known for use in motor drive applications because of their rugged simple construction and ease of control. Only more recently, however, have they actually been implemented in these applications because of developments in power electronics. The typical machine is constructed with a rotor coupled to a shaft which is free to rotate within a stator. The shaft is then drivably coupled to an apparatus such as a pump or other mechanism which requires mechanical energy to operate. The stator of the switched reluctance machine typically has a plurality of diametrically opposed poles which are wound with individual phase windings. The rotor of the machine is constructed from a ferrous material, such as an iron compound, and has a number of salient poles which differs from that of the stator. A unique feature of these machines is that the rotor contains no windings or magnets, and requires no separate excitation. This allows high speed operation without the risk of the rotor flying apart under the centrifugal forces which may be associated with a wound or permanent magnet rotor.

The machine operates by switching current into each of the individual phase windings in a predetermined sequence. This energization of the phase windings creates a magnetic force which attracts a salient pole of the rotor to move into alignment with the opposed poles of the stator, a position which minimizes the reluctance between the stator poles. As the rotor pole moves into alignment, that phase winding is switched off, and the next phase is energized to continue the rotation of the rotor. In this way, a torque is developed to drive the shaft. If it is desired to slow the rotation of the shaft, the phase winding is allowed to remain energized past alignment of the rotor pole, and the magnetic force of attraction produces a negative or braking torque which tries to pull the rotor back into alignment. This results in a braking action, and thus a slowing of the shaft.

During this braking action electrical energy is returned to the bus in the form of a generated current. This occurs as the electromotive force (emf) which is generated in this negative torque region is in the direction to aid current flow. This acts to rapidly increase current flow through the winding. When the switches are turned off, the phase current through the winding will increase for a time, peak, and then decay. This current is forced to flow trough the flyback diodes and back to the dc bus. The net dc current which is returned to the bus is the sum of the currents from all of the phases, and produces a net generating effect. If the rotor were driven from an engine, this mode of operation would produce a net increase of energy flow to the bus, and could sustain the bus voltage under a connected load.

U.S. Pat. No. 5,012,172 describes a control method for use when a switched reluctance machine is operated in this negative torque, or generating mode. The method described therein uses the angular displacement between the rotor and the stator poles as the controlling parameter to regulate the amount of energy returned to the bus. By determining the amount of current required to maintain the bus voltage, the angle at which the switches are turned on is varied. As more current is required, the turn on angle of the switches is advanced. The energy returned to the bus may also be regulated, as disclosed in this patent, by varying the angle at which the switches are turned off.

This method, however, requires the use of a high speed, highly accurate resolver and associated circuitry to determine the exact angular displacement of the rotor pole with respect to the associated stator pole. An error in the monitored switching angle may result in a large error in the amount of current generated, and thus a net increase or a decrease in the bus voltage seen by the utilization equipment. This error may require that the system initiate an overcurrent protection if too great. Although this approach may provide adequate performance, the increased expense on the precision circuitry and the potential for error limits is applicability.

The present invention is directed at overcoming one or more of the above problems.

SUMMARY OF THE INVENTION

It is the principle objective of the present invention to provide a new and useful starter/generator system. More particularly, it is the objective of the present invention to provide an electric power starter/generator system for converting electrical energy from a remote dc electrical power source coupled to a dc distribution bus to mechanical energy to start a turbine engine in a start mode, and for converting mechanical energy from the turbine engine to electrical energy to power utilization equipment connected to the dc bus in a generate mode.

An embodiment of the present invention comprises a switched reluctance machine having a rotor, which comprises a plurality of salient poles, drivably coupled to the engine by a shaft, and a stator having a plurality of stator poles wound with phase windings. The system further comprises an inverter having a dc input/output coupled to the dc distribution bus, and at least a first and a second switch responsive to switching control signals for coupling each of the phase windings to the dc bus, and at least a first and a second diode for cross-coupling each of the phase windings to the dc bus to allow current flow back when the switches are disabled. A rotor position resolver, or other position sensing device, positioned within the switched reluctance machine monitors the angular position of the rotor, and generates a rotor position control signal which is transmitted to a controller. Current sensors, positioned in proximity to the phase windings, monitor the current flowing in each of the windings, and generate phase current sense signals which are also transmitted to a controller. Additionally, at least one voltage sensor is coupled to the dc bus for monitoring the dc voltage at a point of regulation. This dc voltage sensor generates a bus voltage sense signal which is also transmitted to a controller.

Further in accordance with the present invention, a controller having a plurality of control inputs and outputs is coupled to the inverter for monitoring and controlling system performance during the start mode and the generate mode of system operation. For the generate mode of operation, this controller monitors the rotor position control signal and generates switching control signals to enable at least the first and said second switches for each of the phase windings at a fixed angle prior to alignment of the rotor pole with the phase winding's associated stator pole. In this way, the phase winding is coupled to the dc bus, and dc phase current is allowed to flow from the dc bus, through the switches, and to the phase winding to energize it. The controller further generates switching control signals to disable the switches at a fixed angle after alignment of the rotor pole with the phase winding's associated stator pole. This decouples the phase winding from the dc bus and forces dc current flow back from the phase winding, through the diodes, and to the dc bus to allow the switched reluctance machine to operate in the generate mode.

During this generate mode of operation, the controller monitors the phase current sense signals and the dc bus voltage sense signal, and calculates a maximum, $I_{HI}$, and a minimum, $I_{LO}$, phase current control signal. The signals define a control band which varies with the system dc bus voltage. The controller modulates the switching control signals to regulate the dc phase current within this control band. This allows the controller to maintain the bus voltage at a desired level regardless of the system load, and removes the sensitivity to switching angles.

The controller further receives an external start command signal and a torque command signal to initiate the start mode of operation. The controller then determines the angular velocity of the rotor, and calculates a maximum start current command in open loop, approximately linear algebraic relation to the commanded torque signal. The controller generates switching control signals to enable the switches, thus coupling the stator winding to the dc bus to facilitate current flow through the winding to establish torque sufficient to accelerate the engine to idle speed. The switching control signals are generated at an on-advance angle prior to alignment of the rotor pole with the phase winding's associated stator pole in accordance with an algebraic relationship. The controller further generates switching control signals to disable the switches to decouple the stator winding from the dc bus. The switching control signals are generated at an off-advance angle prior to alignment of the rotor pole with the phase winding's associated stator pole in accordance with another algebraic relationship. These relationships allow the on-advance and the off-advance angles to vary with the speed of the rotor and/or the commanded current.

BRIEF DESCRIPTION OF THE DRAWINGS

While the specification concludes with claims particularly pointing out and distincly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1:
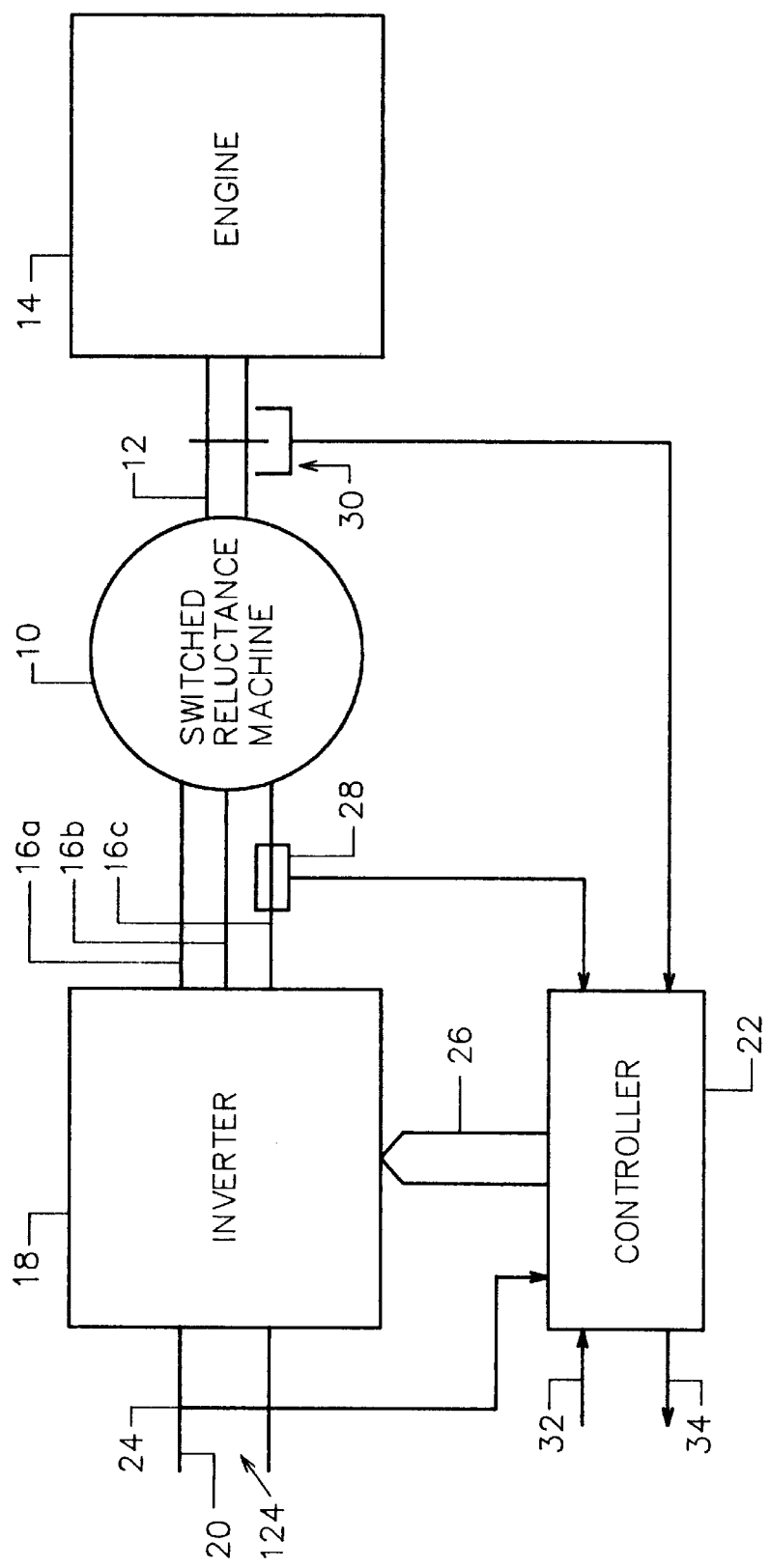
FIG. 1 is a system level block diagram to which the instant invention is particularly applicable.

The starter/generator system of the instant invention, as illustrated in FIG. 1, comprises a switched reluctance machine 10 having a rotor (not shown) drivably coupled by shaft means 12 to a turbine engine 14. The shaft means 12 may preferably provide direct coupling to the engine 14, or may provide coupling through appropriate gearing or differentials as desired. The machine 10 is electrically coupled by a plurality of phase leads 16a, 16b, 16c to an inverter 18, which is electrically coupled by a dc input/output 124 to a dc distribution bus 20. A controller 22 monitors this dc distribution bus 20 at a point of regulation 24, and provides control signals 26 to the inverter 18. Current sensing means 28 are used to monitor current flow in the phase leads 16a, 16b, 16c, and rotor position resolving means 30 are used to monitor rotor position and speed. External system communications, including control inputs 32 and status outputs 34, are also provided through the controller.

This system is preferably a high voltage dc system, although the concepts described herein have equal applicability to a dc link variable speed constant frequency (VSCF) system. Preferably, the starter generator system described herein is a 270 volt dc system that performs two primary functions. The first function is to start the turbine engine 14 using the available high voltage dc from the dc distribution bus 20. The second function is to extract power from the engine 14 to generate high voltage dc, with power quality as defined by applicable industry standards, such as MIL-STD-704E and others.

Figure 2:
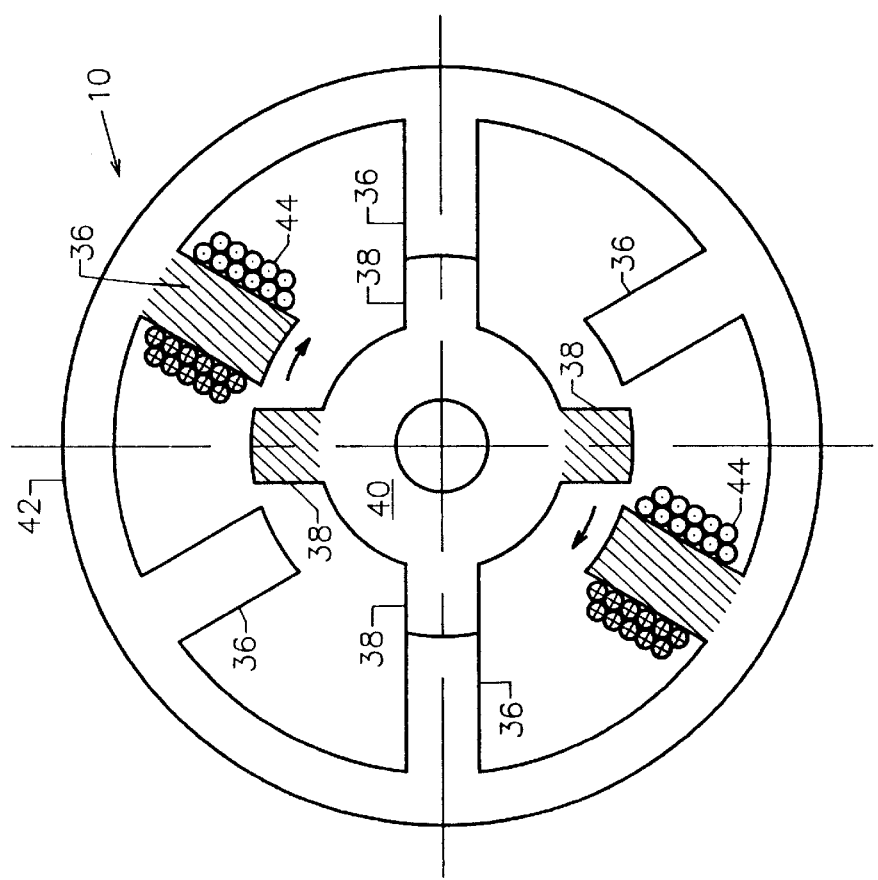
FIG. 2 is a diagrammatic cross section of a switched reluctance machine applicable to the instant invention.

To perform these functions, a switched reluctance machine 10 is utiized to operate in both start mode, from zero to engine idle speed, and in generate mode, from idle to full engine speed. Overspeed operation in excess of 50,000 rpm is also capable with this machine 10. The machine topology, as illustrated by the cross section of FIG. 2, utilizes a first plurality of salient stator poles 36 and a second plurality of salient rotor poles 38. Advantageously, a 6/4 topology having six stator poles 36 and four rotor poles 38 is used. As is recognized by one skilled in the art, a different topology could be utilized with corresponding changes in the inverter 18 and the controller 22 without departing from the scope of the invention.

Both the rotor 40 and the stator 42 are made of thin, high strength iron laminations (not shown) to keep iron losses to a minimum. It has been found that vanadium iron cobalt (2V49FeCo) provides acceptable characteristics. The stator windings 44 consist of Litz conductors to minimize the eddy current losses associated with the maximum fundamental operating frequency. The laminations (not shown) are carefully annealed to obtain the desired magnetic and mechanical properties. The dc magnetization, ac core losses, and the mechanical tensile properties play a fundamental role in the design of the machine 10, and must be taken into account in the thermal, stress and electromagnetic analysis. At lower speeds the output power is limited by the engine characteristics. At high speed friction and windage losses become the dominant factor in machine efficiency. As expected, higher efficiencies are obtained at higher power levels.

Figure 3:
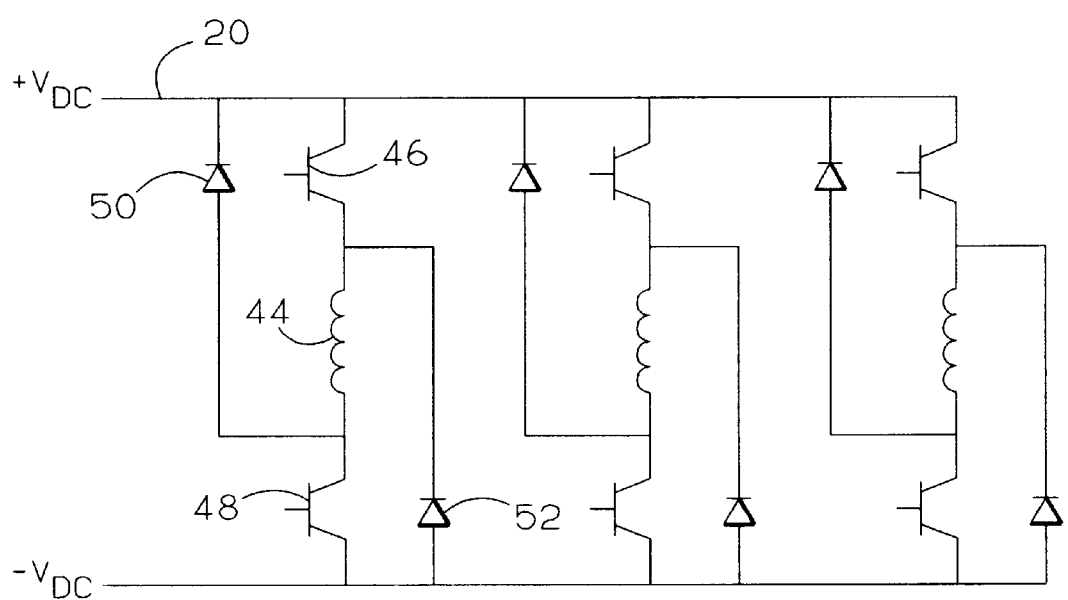
FIG. 3 is a single line schematic diagram of an embodiment of the instant invention.

Referring back to FIG. 1, the inverter 18 receives power from the dc distribution bus 20 during engine starting and provides power to the dc distribution bus 20 during generation. The inverter topology, as illustrated in FIG. 3, comprises switching means, such as the two switches 46, 48, and commutation means, such as the two diodes 50, 52, for each stator pole phase winding 44. Each phase of the inverter 18 is identical, and, therefore, only one phase will be described in detail herein. The switch reluctance machine phase winding 44 is in series with both switches 46, 48. As the switches 46, 48 are gated into conduction or enabled, current flows from the dc distribution bus 20 to energize the winding 44. When the switches 46, 48 are gated out of conduction or disabled, the current is forced to commutate through the cross-coupled diodes 50 and 52 because the direction and magnitude of current flow through the winding 44 cannot change instantaneously.

Figure 4:
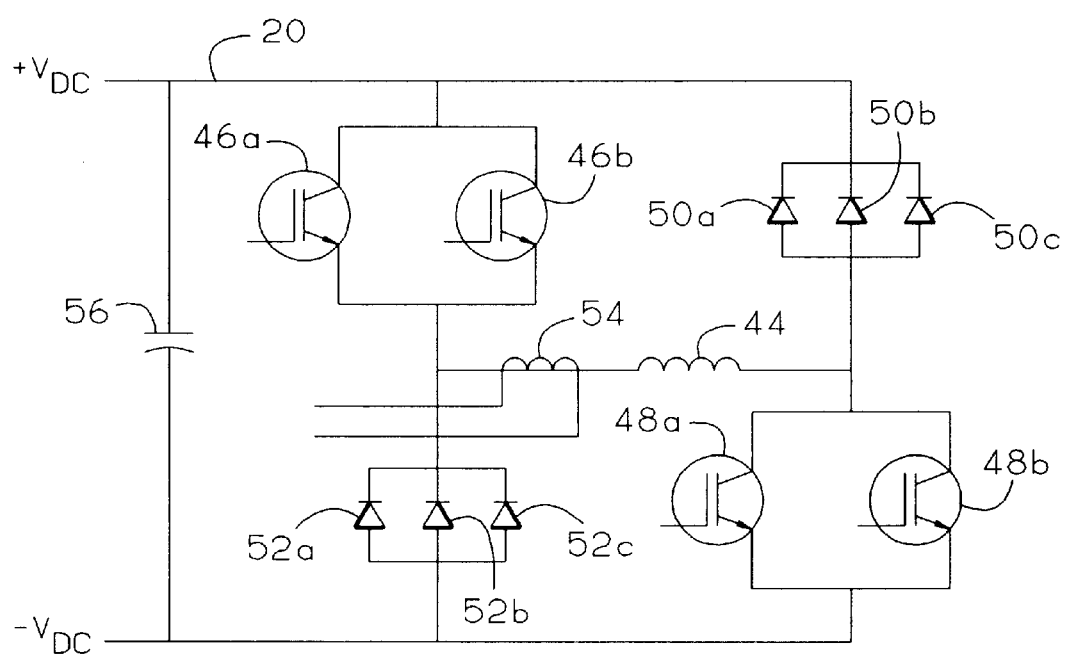
FIG. 4 is a single line topology diagram of one phase on an embodiment of the instant invention.

Preferably, the switches 46, 48 are insulated gate bipolar transistors (IGBTs), although other power switching devices such as MOS-controlled thyristors (MCT) may be use as appropriate. Currently, these switches have a rating of 600 volts and 300 amperes, and, therefore, two IGBTs 46a, 46b, and 48a, 48b (see FIG. 4) are used in parallel. The diodes are rated at 600 volts and 85 amperes, and, therefore, three diodes 50a, 50b, 50c, and 52a, 52b, 52c are used in parallel. Current sensing means, such as current sensor 54, having a bandwidth extending from dc to greater than 50 klHz, is included in each phase to provide feedback of the instantaneous phase current to the controller 22 (FIG. 1). A link capacitor bank 56, preferably comprising multilayer ceramic (MLC) capacitors, is used to meet the operating environment requirements, and, in the preferred embodiment, has a capacitance of approximately 840 microfarad to aid in system stability. The system is capable of handling high di/dt values, which occur during turn on and turn off of the IGBTs 46a, 46b, and 48a, 48b, which is inherent with switch reluctance systems because of the low unaligned impedances in the machine.

Figure 5:
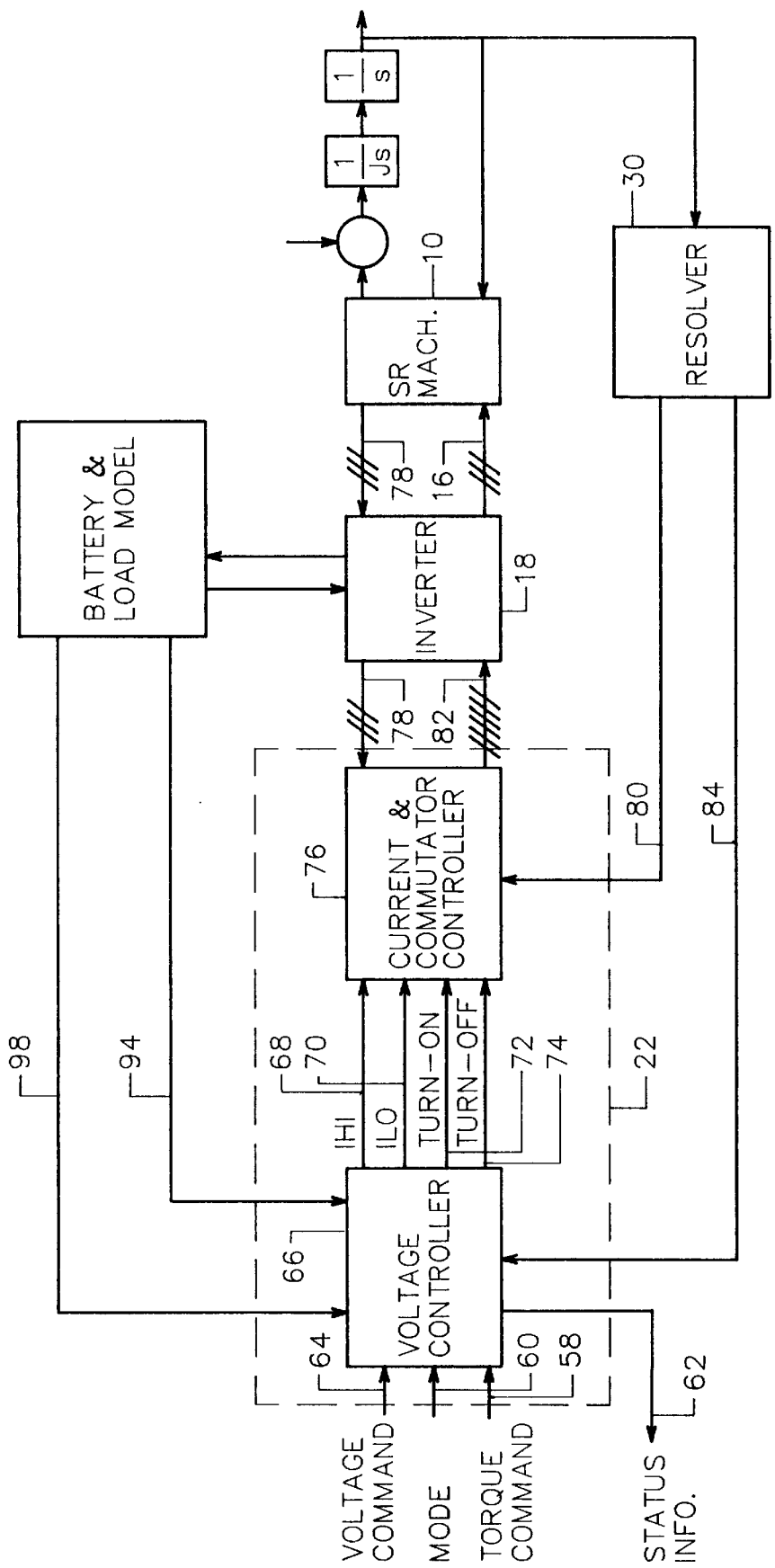
FIG. 5 is a control system block diagram of the instant invention.

The controller 22 provides starter/generator system control and protection for all modes of operation including engine start and dc power generation. In addition the controller 22 (see FIG. 5) provides interface to the external engine controller (not shown) to accept commands, such as the torque command 58 and the mode command 60, and tellback status information 62. Within the controller 22 a voltage control module 66 processes the mode command 60, the torque command 58, and the speed feedback signal 84 in the start mode, and the mode command 60 and the internal voltage command 64 in the generate mode. The voltage control module 66 then communicates a maximum phase current, $I_{HI}$, control signal 68, a minimum phase current, $I_{LO}$, control signal 70, a turn-on control signal 72, and a turn-off control signal 74 to a current and commutator control module 76. This current and commutator control module 76 processes these signals 68, 70, 72, and 74, as well as the phase current feedback signals 78 (generated by current sensing means 28 of FIG. 4) and the angular position feedback signal 80 generated by the rotor position resolving means 30. The module 76 then generates switch commands 82 and transmits them to the inverter 18. The inverter 18 then configures the switches (not shown) to connect the phase voltage on lines 16 to the phase windings (not shown) of the switched reluctance machine 10.

In the start mode, the controller 22 receives a torque command 58 from the engine controller (not shown) and calculates the necessary turn-on 72 and turn-off 74 angles and the maximum, $I_{HI}$, 68 and minimum, $I_{LO}$, 70 phase current commands. The controller 22 commands the inverter 18 to excite the switched reluctance machine 10 to produce the necessary torque to accelerate the engine (not shown) to its light-off speed, and aid in acceleration to idle speed. During this mode of operation, the current and commutator controller 76 allows a both switches on, one switch off chopping strategy. By alternating the switch turned off, the effective switch chopping frequency is halved, reducing the stress on the power switch (not shown). Closed loop control during the start mode is not necessary with the instant invention because the relationship between the control variables and the output torque is linearized through an algebraic relationship. Unlike the prior art systems where the equations for turn-on and turn-off angles are curve fits, the instant invention utilizes algebraic relationships based on machine parameters, command torque, bus voltage, and speed to achieve a nearly linear relationship between commanded current and shaft torque over the entire speed envelope to achieve open loop stability. In the preferred embodiment of the instant invention, the current hysteresis band remains a fixed value and the chopping frequency remains between 4 kHz to 8 kHz.

The area enclosed on a flux linkage versus phase current plot is the average torque per electrical cycle. The turn-on and turn-off angles can be adjusted to keep this average torque constant as the speed is varied. Ideally, for constant average torque per electrical cycle and maximum torque per unit current, it is desirable to instantly establish the commanded current as the poles begin to overlap, and to instantly decrease the current to zero when the poles are in the aligned position. The practical implementation is to turn a phase on so that current is established in the phase winding by the time the poles begin to overlap, and the phase is then turned off so that the current decays to zero shortly after the poles are aligned. Commutating at the wrong instant will lead to decreased system efficiency.

Once the maximum phase current command $I_{HI}$ has been determined, the turn-on advance angle is determined using an algebraic relationship, such as is shown in Bose U.S. Pat. No. 4,707,650 as follows:

$$\theta_{on-adv} = \frac{L_{min} * \omega * I_{HI}}{V_{BUS}} \quad (1)$$

where $L_{min}$ is the unaligned inductance. Thus, as the speed $\omega$, and/or the commanded current increases, it is necessary to increase the turn-on advance angle to provide sufficient time for the current to be established in the phase winding. Good performance is achieved with the turn-on angle between approximately 200 and 140 electrical degrees before alignment.

A similar approach is used to calculate the turn-off angle. Unfortunately, the incremental inductance for a machine that operates in saturation is extremely nonlinear. The instant invention, therefore, makes an approximation using the unsaturated inductance profile and assuming that the inductance is approximately equal to the aligned inductance $L_{max}$. With these assumptions, the turnoff advance angle is $$\theta_{off-adv} = \frac{L_{max} * \omega * I_{HI}}{V_{bus} + \left(\frac{\Delta L}{\Delta \theta}\right) * \omega * I_{HI}} \quad (2)$$

The second term in the denominator of (2) is the back emf that results from the changing inductance. When the rotor 38 and stator 36 poles (see FIG. 2) are moving toward alignment, with both phase leg switches 46, 48 (see FIG. 3) open and an increasing inductance, the back emf aids the applied phase voltage in decreasing the phase current. Since the inductance approximations are based on the unsaturated machine characteristics, the calculated turn-off angle advance is much larger than necessary for a saturated machine. Turning the phase off too soon will mean that less energy is input to the phase, which will result in reduced output power. The instant invention overcomes this problem by limiting the turn-off advance angle to approximately 40 electrical degrees before alignment.

In the generate mode, the controller 22 receives a voltage command 64 from the engine controller (not shown). The control objective is to efficiently generate the necessary current to maintain the bus voltage. The voltage control algorithm is capable of maintaining the voltage within limits during load and speed transients with a load that can vary from resistive to constant power. When the switched reluctance machine 10 is generating, the back emf may cause the phase current to increase above the commanded $I_{HI}$ even when both power switches 46, 48 (see FIG. 3) are turned off. This fact makes it difficult to apply the average torque per electrical cycle approach used in developing the start mode algorithm. If only angle control is used, the output current is very sensitive to small changes in turn-on and turn-off angles, poor voltage control results. The instant invention, however, fixes the turn-on and turn-off angles and uses the commanded current to control the output current. This approach results in a simple implementation, good efficiency, and acceptable variation in the plant transfer function in the speed and load range for the system.

Figure 6:
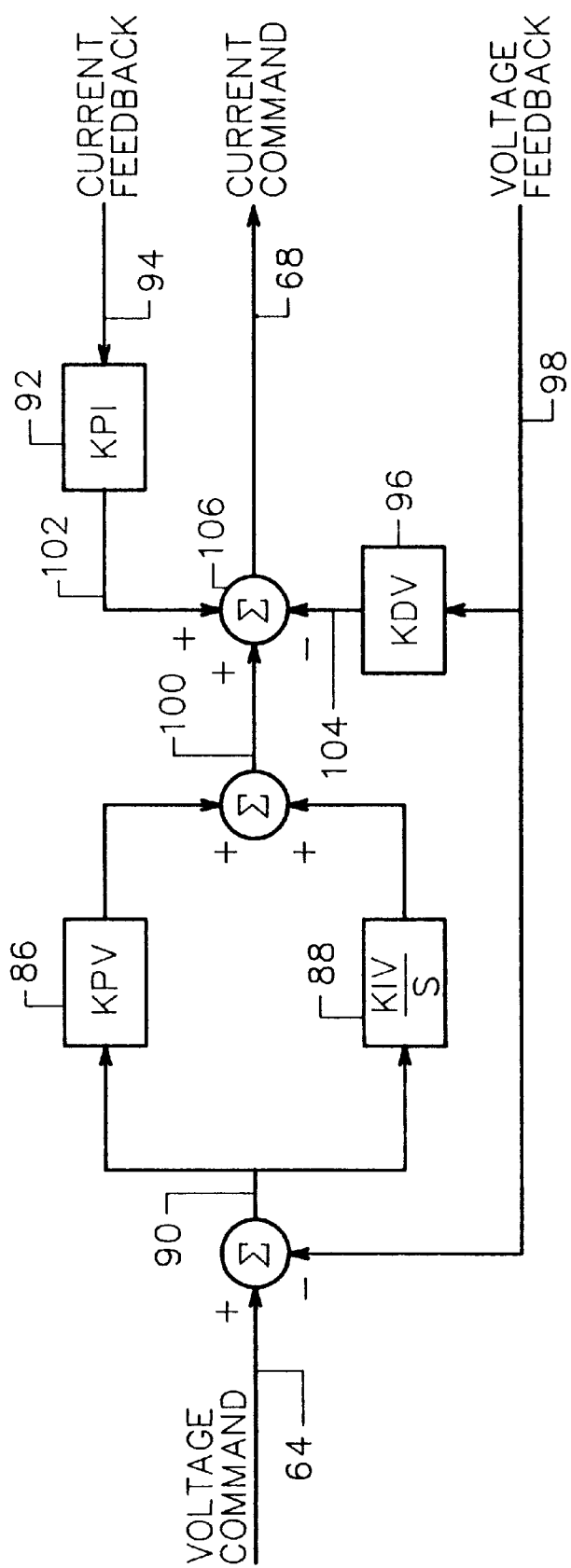
FIG. 6 is a control block diagram of the voltage controller of the instant invention.

As shown in FIG. 6, a proportional 86 plus integral 88 (P-I) control on the voltage error 90, which is developed as the voltage feedback 98 deviates from the commanded voltage 64 as a result of variations of the loading on the dc distribution bus, is used to generate a current command signal 100. This signal 100 is then summed with the output 102 of a proportional term 92 on the load current 94, and the output 104 of a proportional term 96 on the voltage feedback 98. The output of this summing junction 106 produces the maximum phase current, $I_{HI}$, control signal 68 which establishes the upper current limit for the generate control. The minimum current, $I_{LO}$, control signal (not shown) remains in a fixed proportion to the maximum phase current, $I_{HI}$, control signal 68 and defines the lower current limit for the generate control. In an embodiment of the instant invention supplying system loads having high input capacitance, a value of zero is used for the proportional terms KPI 92, and KDV 96.

Figure 7A:
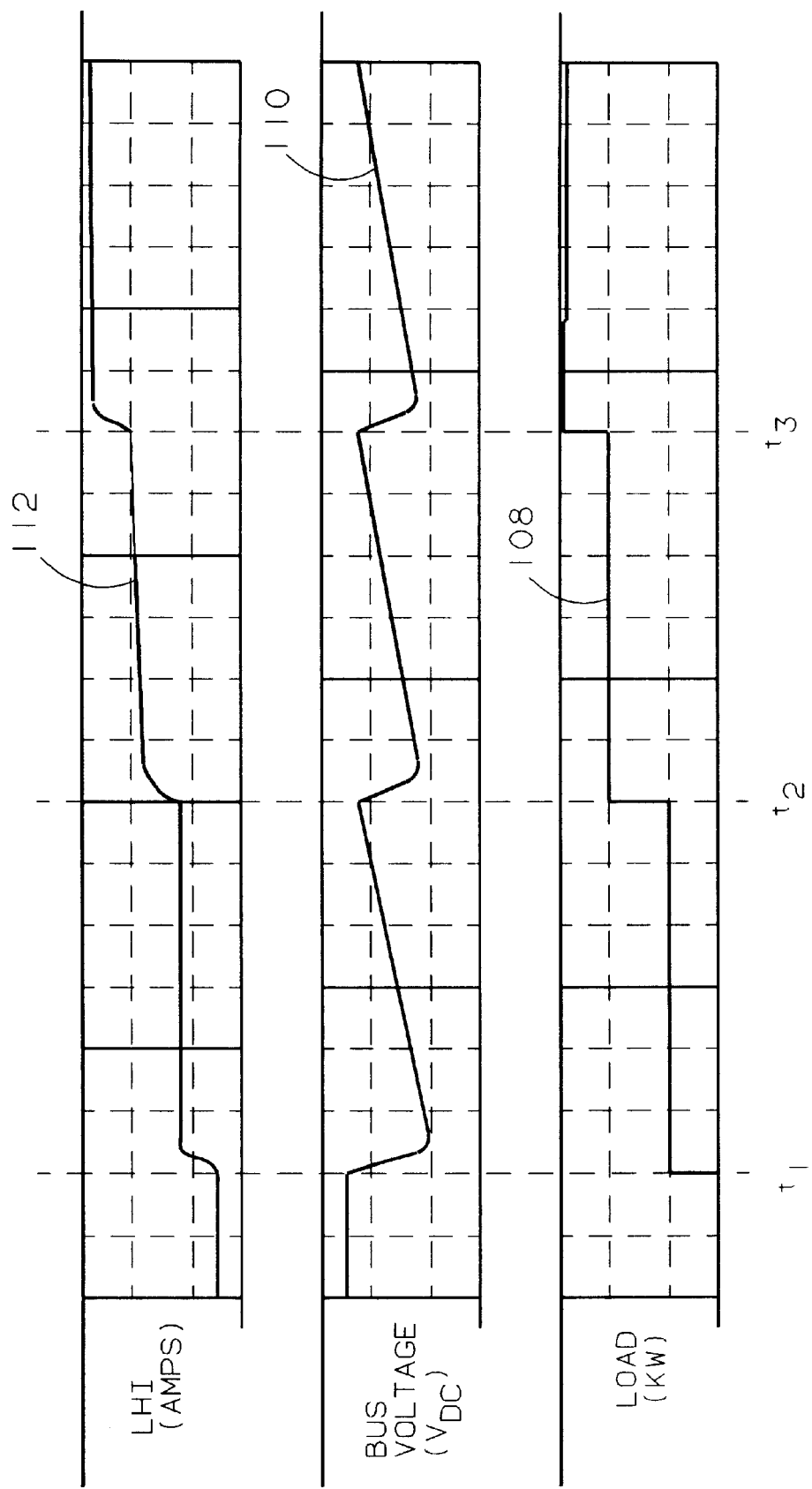
FIG. 7a is a load profile diagram illustrating the variable current control with increasing system load.

FIG. 7a shows the system response to increases in the total load supplied by the switched reluctance machine (not shown). Trace 108 indicates the applied system load which is increased at time $t_1$. As shown by the dc bus voltage trace 110 which indicates the output voltage of the dc distribution bus coupled to the machine (not shown), the voltage droops as a result of the applied load at time $t_1$. Once the droop is sensed by the voltage controller 66 (see FIG. 5) the current command, trace 112, is increased, which increases the maximum current, $I_{HI}$, limit and hence the total amount of current generated by the machine (not shown), to allow recovery of the dc bus voltage. This pattern is repeated at times $t_2$ and $t_3$ as the system load is increased still further.

Figure 7B:
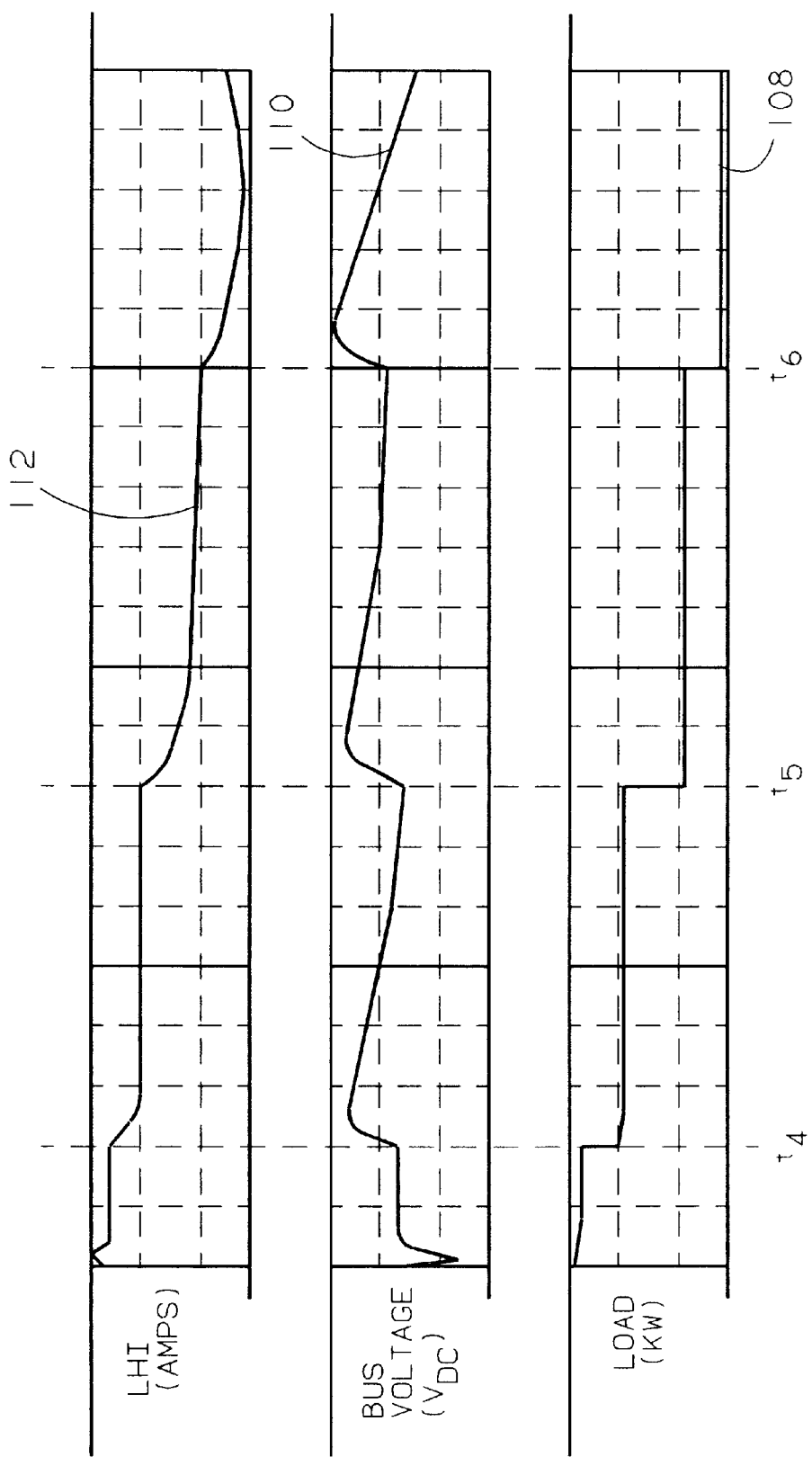
FIG. 7b is a load profile diagram illustrating the variable current control with decreasing system load.

FIG. 7b illustrates the system response to decreases in the total load supplied by the switched reluctance machine (not shown). Trace 108 indicates the applied system load which is decreased at time $t_4$. As shown by the dc bus voltage trace 110 which indicates the output voltage of the dc distribution bus coupled to the machine (not shown), the voltage increases as a result of the load removal at time $t_4$. Once the increase is sensed by the voltage controller 66 (see FIG. 5) the current command, trace 112, is decreased, which decreases the maximum current, $I_{HI}$, limit and hence the total amount of current generated by the machine (not shown), to allow recovery of the dc bus voltage. This pattern is repeated at times $t_5$ and $t_6$ as the system load is decreased still further.

As indicated above, the turn-on angle is fixed in the instant invention before alignment, and regulation of the dc distribution bus is achieved by varying a current control band. Preferably, the turn-on angle is fixed at approximately 40 electrical degrees before alignment of the stator and rotor pole (see FIG. 2). The turn-off angle is also fixed in the instant invention after alignment. Preferably, the turn-off angle is fixed at approximately 120 electrical degrees after alignment. By fixing the turn-on and turn-off angles and controlling the phase current as a function of the dc bus voltage within an adjustable band, the need for a high speed, high resolution resolver to precisely monitor the turn-on and turn-off angles is eliminated with no reduction in the regulation power quality.

Figure 8A:
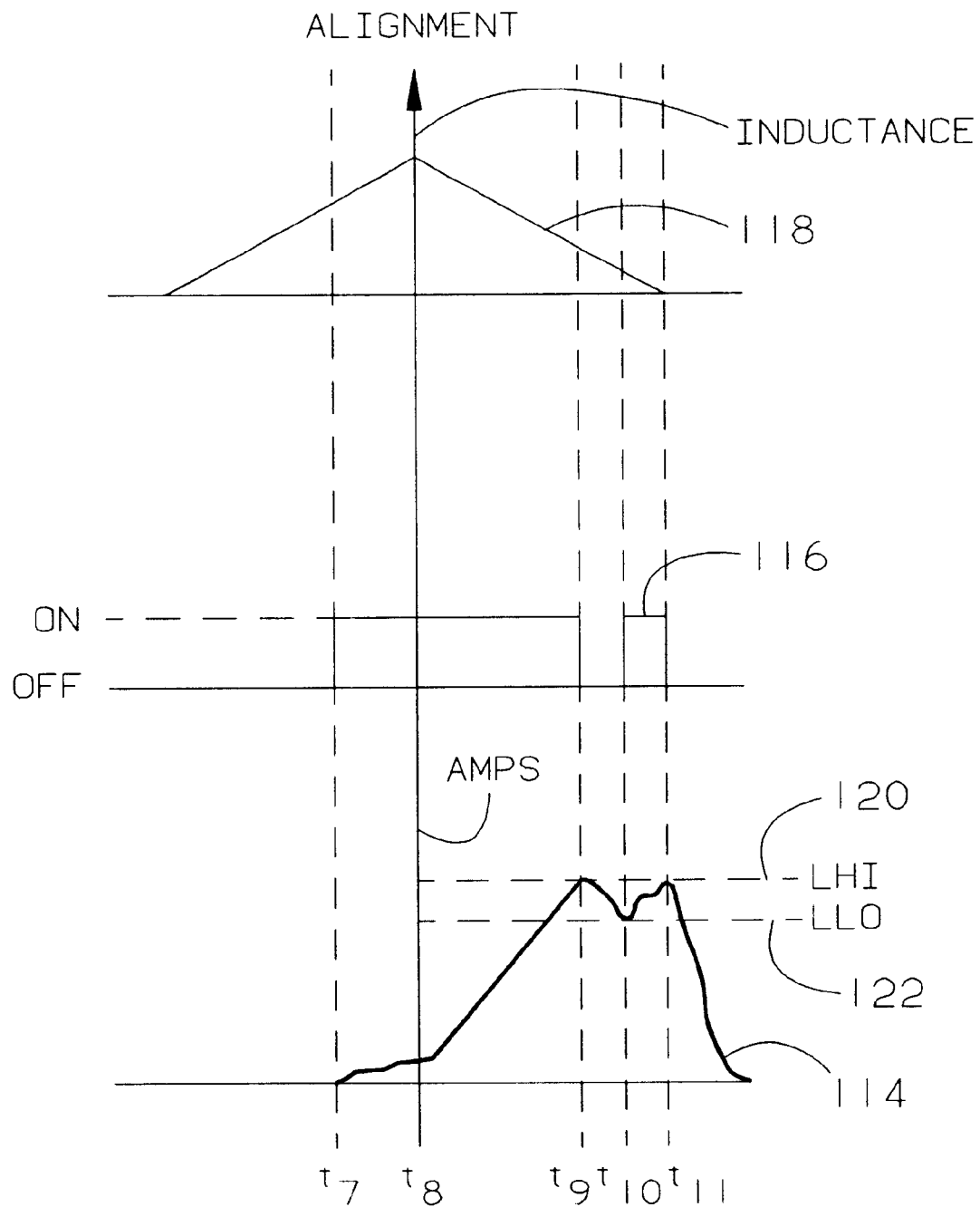
FIG. 8a is a control signal diagram illustrating the system generate mode control for a heavy loading condition.

FIG. 8a illustrates the fixed angle, adjustable band control of the instant invention for a given speed and a high system load. As the inductance increases due to the rotor and stator poles (not shown) coming into alignment, as indicated by trace 118, both power switches 46, 48 (see FIG. 3) are turned on at time $t_7$ at a fixed angle of approximately 40 electrical degrees before alignment, as indicated by trace 116, and current is established in the phase winding 44 (FIG. 3), as indicated by trace 114. As the poles align at time $t_8$ and begin to move away from alignment, the inductance 118 begins decreasing and the back emf aids the applied bus voltage in increasing the phase current 114. When the phase current 114 reaches the maximum phase current, $I_{HI}$, limit 120 at time $t_9$, both switches 46, 48 (see FIG. 3) are turned off 116, the back emf opposes the bus voltage, and current is forced to commutate through the diodes 50, 52 (see FIG. 3) back to the dc bus 20 (see FIG. 3). If the phase current 114 decays to the minimum phase current limit 122, as indicated in FIG. 8a at time $t_{10}$, both switches are again turned on to maintain the phase current 114 within the range defined by these two limits 120, 122. At time $t_{11}$ however, the rotor and stator poles have reached the fixed turn-off angle after alignment, both switches are disabled, and the phase current 114 rapidly decays.

Figure 8B:
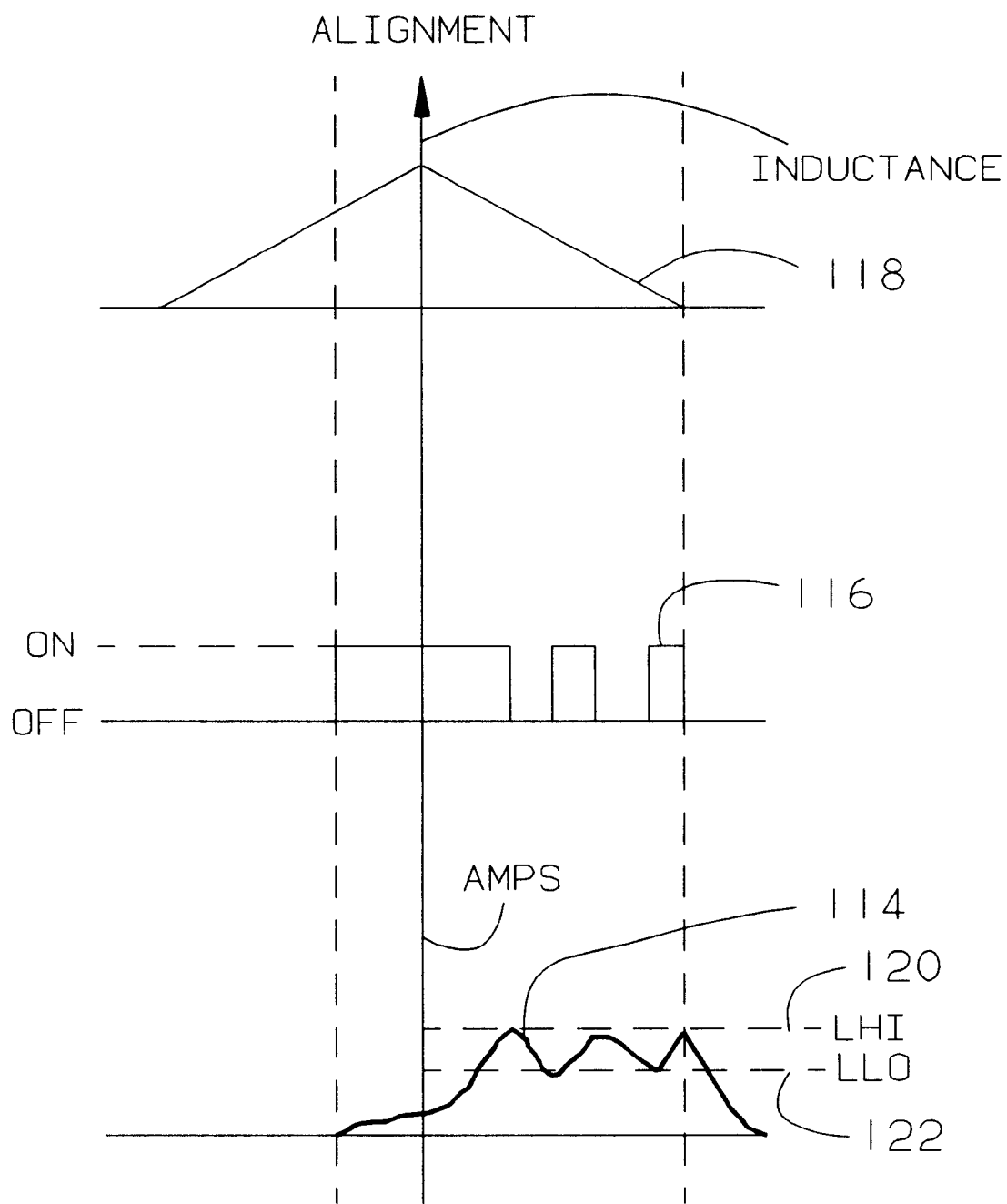
FIG. 8b is a control signal diagram illustrating the system generate mode control for a medium loading condition.
Figure 8C:
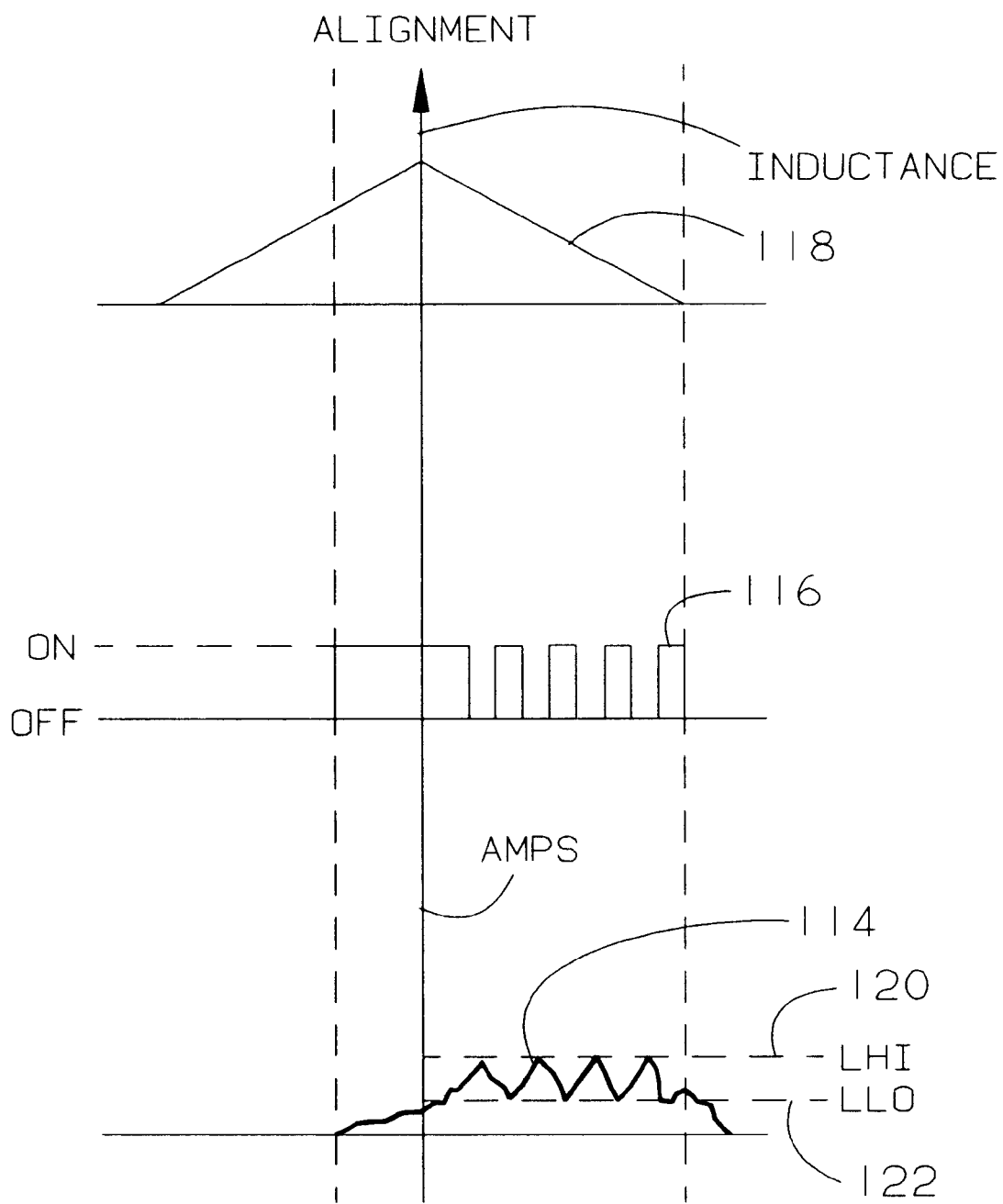
FIG. 8c is a control signal diagram illustrating the system generate mode control for a light loading condition.

FIG. 8b illustrates the same control method during a smaller connected loading condition at the same speed. In this situation, the power switches 46, 48 (see FIG. 3) are still enabled at the same fixed angle prior to alignment, and disabled at the same fixed angle after alignment as the heavier loaded condition, but the maximum, $I_{HI}$, 120 and minimum, $I_{LO}$, 122 phase current limits have been reduced with the reduced load. As a result, the switches 46, 48 (see FIG. 3) must be turned off and back on (modulated) more often, as indicated by trace 116, to maintain the phase current 114 within the range defined by the lowered limits 120, 122. This pattern continues as the connected load is reduced still further at a given speed as indicated by FIG. 8c.

Further in accordance with a preferred embodiment of the instant invention, a method of controlling the switched reluctance machine 10 (see FIG. 1) having a salient pole rotor 40 (see FIG. 2) drivably coupled to an engine 14 by shaft means 12 (see FIG. 1), and a multi-phase, multi-pole wound stator 42 (see FIG. 1) having its phase windings 44 switchably coupled to a dc power bus 20 by switching means, such as power switches 48, 48 (see FIG. 3) to allow excitation current flow and by commutation means, such as by diodes 50, 52, to allow generation current flow, to allow operation as a generator comprises the steps of: (1) enabling the power switches 46, 48 for a selected phase winding 44 to allow excitation current flow from the dc power bus 20 to energize the selected phase winding 44 at a fixed angle prior to alignment of a rotor pole 38 (see FIG. 2) with the energized stator pole 36; (2) disabling the switches 46, 48 (see FIG. 3) to allow generation current flow through the diodes 50, 52 to the dc power bus 20 at a fixed angle after alignment of the rotor pole 38 (see FIG. 2) with the energized stator pole 36; (3) monitoring the voltage on the dc power bus 20 (see FIG. 1) at a point of regulation 24; (4) calculating a maximum phase current, $I_{HI}$, control signal 68 (see FIG. 5) and a minimum phase current, $I_{LO}$, control signal 70 based on the voltage on the dc power bus 20; and (5) regulating the voltage on the dc power bus 20 by modulating the switches 116 (see FIGS. 8a, 8b, 8c) to control the excitation and generation current flow 114 within the variable limits defined by the maximum phase current, $I_{HI}$, control signal 120 and the minimum phase current, $I_{LO}$, control signal 122.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. An electric power starter/generator system for converting electrical energy from a remote dc electrical power source coupled to a dc distribution bus to mechanical energy to start a turbine engine in a start mode, and for converting mechanical energy from the turbine engine to electrical energy to power utilization equipment connected to the dc distribution bus in a generate mode, comprising:

a switched reluctance machine having a rotor drivably coupled to the engine by shaft means, and a stator having a first plurality of salient stator poles wound with phase windings, said rotor comprising a second plurality of salient rotor poles;

an inverter having a dc input/output coupled to the dc distribution bus, and at least a first and a second switching means responsive to switching control signals for coupling each of said phase windings to the dc distribution bus, and at least a first and a second commutation means for cross-coupling each of said phase windings to the dc distribution bus to allow current flow back when said switching means are disabled;

rotor position resolving means positioned within said switched reluctance machine for monitoring the angular position of said rotor, said resolving means generating a rotor position control signal;

current sensing means positioned in proximity to said phase windings for monitoring current flowing in each of said phase windings, said current sensing means generating phase current sense signals;

voltage sensing means coupled to the dc distribution bus for monitoring dc voltage at a point of regulation, said dc voltage sensing means generating a bus voltage sense signal;

a controller having a plurality of control inputs and outputs coupled to said inverter for monitoring and controlling system performance during the start mode and the generate mode of system operation; and wherein said controller monitors said rotor position control signal and generates said switching control signals to enable at least said first and said second switching means for each of said phase windings at a fixed angle prior to alignment of said rotor pole with said phase winding's associated stator pole thereby coupling said phase winding to the dc distribution bus and allowing dc phase current to flow from the dc distribution bus, through at least said first switching means, said winding, and at least said second switching means, said controller further generating said switching control signals to disable at least said first and said second switching means at a fixed angle after alignment of said rotor pole with said phase winding's associated stator pole, thereby decoupling said phase winding from the dc di,trihiiton bus and forcing dc current flow back from said phase winding, through at least said first and said second commutation means, and to the dc distribution bus to allow said switched reluctance machine to operate in the generate mode of operation; and wherein said controller monitors said phase current sense signals and said dc bus voltage sense signal, calculates a maximum phase current control signal and a minimum phase current control signal, and modulates said switching control signals to regulate said dc phase current within a range defined by said maximum phase current control signal and said minimum phase current control signal, said controller maintaining the bus voltage at a desired level thereby.

2. An electric power starter/generator system as recited in claim 1, wherein said maximum phase current control signal varies as a function of said dc bus voltage sense signal.

3. An electric power starter/generator system as recited in claim 1, wherein said minimum phase current control signal varies in fixed proportion to said maximum phase current control signal.

4. An electric power starter/generator system as recited in claim 1, wherein said maximum phase current control signal increases as said dc bus voltage sense signal decreases below a set value corresponding to a desired bus voltage.

5. An electric power starter/generator system as recited in claim 1, wherein said controller utilizes proportional integral control to generate said maximum phase current control signal.

6. An electric power starter/generator system as recited in claim 1, wherein said switching means are insulated gate bi-polar transistors.

7. An electric power starter/generator system as recited in claim 1, wherein said controller receives a start command signal and a torque command signal to initiate the start mode of operation, and wherein said controller determines the angular velocity of said rotor, and calculates a maximum start current command in open loop, approximately linear algebraic relation to said commanded torque signal.

8. An electric power starter/generator system as recited in claim 7, wherein said controller further generates said switching control signals to enable at least said first and said second switching means to couple said stator winding to the dc bus to facilitate current flow through said winding and establish torque sufficient to accelerate the engine to idle speed, said switching control signals being generated at an on-advance angle prior to alignment of said rotor pole with said phase winding's associated stator pole.

9. An electric power starter/generator system as recited in claim 8, wherein said controller generates said switching control signals to disable at least said first switching means to decouple said stator winding from the dc bus, said switching control signals being generated at an off-advance angle prior to alignment of said rotor pole with said phase winding's associated stator pole.

10. An electric power starter/generator system as recited in claim 8, wherein said controller generates said switching control signals to disable at least said second switching means to decouple said stator winding from the dc bus, said switching control signals being generated at an off-advance angle prior to alignment of said rotor pole with said phase winding's associated stator pole.

11. An electric power starter/generator system as recited in claim 8, wherein said controller generates said switching control signals to alternately disable at least said first and said second switching means to decouple said stator winding from the dc bus, said switching control signals being generated at an off-advance angle prior to alignment of said rotor pole with said phase winding's associated stator pole.

12. A method of controlling a switched reluctance machine to allow operation as a generator, the machine having a salient pole rotor drivably coupled to an engine by shaft means, and a multi-phase, multi-pole wound salient pole stator having its phase windings switchably coupled to a dc power bus by switching means to allow excitation current flow and by commutation means to allow generation current flow, comprising the steps of:

enabling the switching means for a selected phase winding to allow excitation current flow from the dc power bus to energize the selected phase winding at a fixed angle prior to alignment of a rotor pole with the energized stator pole;

disabling the switching means to allow generation current flow through the commutation means to the dc power bus at a fixed angle after alignment of the rotor pole with the energized stator pole;

monitoring the voltage on the dc power bus at a point of regulation;

calculating a maximum phase current control signal and a minimum phase current control signal based on the voltage on the dc power bus; and regulating the voltage on the dc power bus by modulating the switching means to control the excitation and generation current flow within the variable limits defined by said maximum phase current control signal and said minimum phase current control signal.

13. A method of controlling a switched reluctance machine to allow operation as a generator, the machine having a salient pole rotor drivably coupled to an engine by shaft means, and a multi-phase, multi-pole wound salient pole stator having its phase windings switchably coupled to a dc power bus by switching means to allow excitation current flow and by commutation means to allow generation current flow, comprising the steps of:

enabling the switching means for a selected phase winding to allow current flow from the dc power bus to energize the selected phase winding for a period beginning at a fixed angle prior to alignment of a rotor pole with the energized stator pole, and ending at a fixed angle after alignment of the rotor pole with the energized stator pole; and calculating a maximum phase current control signal and a minimum phase current control signal based on the dc power bus voltage; and modulating the switching means during said period to maintain the excitation and generation current flow within the range defined by said maximum phase current control signal and said minimum current control signal.

* * * * *